United States Patent [19]

Budinger et al.

[11] 4,198,739
[45] Apr. 22, 1980

[54] PRINTING ROLLER WITH POLYMERIC CONER AND METHOD OF MAKING THE SAME

[75] Inventors: William D. Budinger, Chadds Ford, Pa.; James L. Keen, Hockessin; Joseph D. Kellner, Wilmington, both of Del.

[73] Assignee: Rodel, Inc., Newark, Del.

[21] Appl. No.: 687,717

[22] Filed: May 19, 1976

[51] Int. Cl.$^2$ .......... B29B 27/12; B32B 7/10
[52] U.S. Cl. .................. 29/132; 29/110; 156/86; 156/294; 156/310
[58] Field of Search ........ 156/85, 86, 294, 153, 156/154, 149, 310, 325–335; 29/130, 132, 120, 110; 264/342 R; 215/1 C, 12 R; 174/DIG. 8; 53/30 S

[56] References Cited

U.S. PATENT DOCUMENTS

| | | | |
|---|---|---|---|
| 2,161,036 | 6/1939 | Gremmel et al. | 156/294 |
| 2,311,308 | 2/1943 | Thomas et al. | 156/294 |
| 2,790,285 | 4/1957 | Pike et al. | 174/DIG. 8 |
| 3,067,078 | 12/1962 | Gluck | 156/153 |
| 3,343,976 | 9/1967 | Matlock | 156/153 |
| 3,379,218 | 4/1968 | Conde | 174/DIG. 8 |
| 3,435,500 | 4/1969 | Aser et al. | 156/86 |
| 3,673,040 | 6/1972 | Hill | 156/294 |
| 3,749,621 | 7/1973 | Shoffner | 156/86 |
| 3,770,556 | 11/1973 | Evans et al. | 174/DIG. 8 |
| 3,990,661 | 11/1976 | Groef | 174/DIG. 8 |

*Primary Examiner*—Caleb Weston
*Attorney, Agent, or Firm*—Seidel, Gonda, Goldhammer & Panitch

[57] ABSTRACT

A printing roller and cover therefor and a novel method for their manufacture are provided. A thin tube of heat shrinkable polymeric material is bonded to a metal or a rubber covered metal core. The thin tube is coated on its inner surface with a thermoplastic adhesive and the solvents in the adhesive are evaporated to produce a tack-free adhesive coating. The core is placed within the tube and the tube is heat shrunk around the core at a temperature sufficient to melt the adhesive, thus bonding the tube to the core. Preferably, the core is primed with an adhesive which will cross-link with the adhesive applied to the tube. The thermoplastic tube covering the core is preferably a long-lasting polymer substantially inert to chemical attack, such as a fluorinated hydrocarbon or polyolefin.

14 Claims, 4 Drawing Figures

PRINTING ROLLER WITH POLYMERIC CONER AND METHOD OF MAKING THE SAME

BACKGROUND OF THE INVENTION

The present invention relates to rollers, more specifically, printing rollers. However, the cover and method of the present invention may be applied to any similar structures comprising a plastic coated core, whether or not these are used as printing rollers.

Traditionally, printing rollers have been constructed from a metal core surrounded by a soft rubber coating. Even the highest quality rubber roller begins to deteriorate from the first date of use. Because the rollers are rubber, they are vulnerable to attack by inks and solvents normally used in printing. Maintenance is costly, both in labor required to maintain them and, more importantly, in the down time of the presses.

A major problem with rubber rollers is end swell. This occurs when solvents acting on both the ends of the roller and the surface swell the ends more than the center. Uneven ink carrying ability, improper split of the ink film, poor quality printing and lack of sharpness are often the results of end swell. End swell can be corrected by regrinding the roller, but this solution is only temporary, as the same factors which caused end swell originally are probably still in existence. Other problems of rubber rollers are outlined in L. Harrison, "Roller Maintenance Pays Off", *Reproductions Review & Methods*, October, 1975, pp. 48–49.

There have been attempts in industry to attach a 0.020 inch thick polytetrafluoroethylene or FEP sleeve to a roller by heat shrinking the sleeve around the core. These attempts have not been entirely successful. As the roller is used, the plastic sleeve tends to separate from the roller or move toward one end or the other. With a sleeve of this thickness, a ding, a small dent, tends to remain in the plastic cover. The impression of the ding is sometimes transferred to the printed web.

Aser et al., in U.S. Pat. No. 3,435,500, disclose a steel core roller covered with a cylinder of silicone rubber. This cylinder is then covered with a sleeve of Teflon FEP, duPont's fluorinated ethylene/propylene. The Teflon FEP sleeve is then etched and primed on its inner surface and heat shrunk around a rubber mandrel after the mandrel has been coated with a suitable silicone rubber adhesive. The roller is intended for use primarily in the field of xerography as the heated pressure fusing device used in fusing resinous powder images onto sheets of paper to which which the powder images have been transferred after being formed by deposition of powder on an electrostatic latent image. While the Teflon FEP coated roller is an improvement over the prior art rubber rollers, there are some disadvantages associated with this as well. Also, the adhesives used in the Aser patent are pressure sensitive adhesives which remain tacky during the assembly stage making assembly difficult and inviting dirt and foreign particles to be entrapped between the sleeve and roller. Such tacky adhesive prevents the shipping of the mandrel separately from the Teflon FEP sleeve after the adhesive has been applied to both. It is a decided advantage to be able to ship both parts separately, so that the sleeve alone may be applied to an existing roller for repair purposes. More importantly, since the adhesive never hardens, the cover tends to creep, especially when the roller is operating at high speeds.

Shoffner, in U.S. Pat. No. 3,749,621, bonds a heat shrinkable Teflon FEP sleeve to a roller by a melt bonding process. By this process, the inside surface of the Teflon FEP sleeve is heated to its melting point and pressure bonded to the roller surface. Although Shoffner discloses that a suitable adhesive, dielectrically activated, may be used, it is the melt bonding of the sleeve itself by which the Teflon FEP sleeve is bonded to the roller. The disadvantages of this method are that the temperature must be very carefully controlled so as not to cause degradation of the Teflon FEP. Control devices are very expensive and the process is not adapted for covering rubber coated rollers, as the high temperature required to melt the Teflon FEP would cause the rubber to deteriorate.

Holmes et al., in U.S. Pat. No. 3,481,805, disclose the bonding of a polytetrafluoroethylene (hereinafter PTFE) sleeve over a silicone rubber coated metal roller. The PTFE sleeve, after preliminary etching, is heat shrunk around the roller which was coated with a silicone resin adhesive. As pointed out at column 3, lines 3–4, this adhesive is wet and tacky and the roller should not be touched except at its uncoated metal ends. Thus, it is difficult to orient the sleeve in relation to the roller in Holmes et al.

Heslop et al., in U.S. Pat. No. 3,539,411, disclose a heat recoverable jacket having a mastic coated on its inner surface and further having an anti-tack coating on the inner surface of the mastic, which is used to cover pipe joints. The jacket structure is then slipped over the end of a pipe until it reaches the joint and then heat shrunk to seal the joint. The anti-tack coating goes into solution with the mastic under the temperature conditions used in heat shrinking and it stays in the solution at service temperatures. Although the heat recoverable jacket may be PTFE, the addition of an anti-tack coating to the inner surface of the mastic layer is more expensive than the tack-free adhesive used in the present invention. The greater expense results from the requirement of an additional coating as well as the time and machinery required to apply the extra anti-tack coating. Another disadvantage is that if the proper temperature is not maintained so that the anti-tack coating stays in solution with the mastic, the jacket may separate from the pipe. Such separation would be more likely where the article covered was not a pipe but rather a moving printing roller.

Other patents which relate to the coating of rollers of which applicants are aware are U.S. Pat. Nos. 3,470,046, 3,677,845, 3,826,702 and U.S. Pat. No. Re. 27,028.

SUMMARY OF THE INVENTION

The present invention overcomes the disadvantages of prior art devices by providing rollers and covers made of several different materials, taking advantage of the best features of each. The result is a roller with cleanability and chemical resistance characteristic of the polymeric cover but one that is soft, permanent, and has the good driving characteristics of the underlying core. The rollers require very little maintenance, will not change size and will stay set. The non-porous surfaces will not absorb ink, water, or solvent and will not glaze, swell or shrink, but at the same time, washing the surfaces clean is faster, easier and requires less solvent than rubber. While rubber rollers tend to absorb solvents and vehicles from the ink, thereby causing premature drying, the rollers of the present invention having a non-absorbent surface, are able to print longer as the inks stay fresher. The polymeric surface develops an electrostatic charge as the presses run and this charge helps retain ink particles, keeping them from becoming airborn. There is more uniform ink transfer because the surface accepts ink more readily and uniformly than rubber, and because it does not glaze or change, its uniformity will not change. A major source of hickeys is eliminated because the roller surface cannot disintegrate or pull apart, and as the press runs, small dings will heal themselves.

These advantages are the result of the present invention in which a core is covered by a tough, thermoplastic, heat-shrinkable tubing. The tubing contains a layer of tack-free adhesive on its inner surface. To enhance the adhesion between the tubing and the adhesive, the inner surface of the tubing may be mechanically abraded or chemically etched or both prior to the application of the adhesive. An extra advantage of using a tack-free adhesive is that the preformed tubing and adhesive system may be stored for several months without the loss of adhesive qualities. Handling characteristics in both shipping and in applying the tubing to the roller are thus enhanced. For an even stronger bond between the core and the tubing, the core is preferably primed with an adhesive that is compatible with that used on the inside surface of the tubing and may crosslink therewith. This adhesive may also be tack-free.

The present invention preferably uses a Teflon (duPont's trademark for fluorocarbon polymers including polytetrafluoroethylene (PTFE) and fluorinated ethylene/propylene (FEP) tube of not greater than about 0.025 inch in thickness, preferably 0.010-0.015 inch in thickness, as the wearing sleeve. In general, it is preferred that the tube or cover be as thin as is consistent with good wearing properties, and that it provide a minimal contribution to the overall dimension of the roller, so that the good driving properties of the core will dominate. The tubing having this thickness is generally not self-supportable, but may be, and upon heat shrinking alone, would not be bonded to the core with sufficient strength to prevent shifting etc. Proper adherence between the tubing and the core is maintained by adhesively bonding the tube to the core in the manner set forth more fully below. With the method of the present invention, a peel strength of the cover may be obtained which is greater than the strength of the cover or the elastomer covered core. With a skin or covering of about 0.010 to 0.015 inch, minor dings are substantially self-healing, especially when the sleeve is applied to a rubber-coated core, as the properties of rubber are dominant in the small area of damage.

The present invention also includes a method by which the composite roller is constructed.

BRIEF DESCRIPTION OF THE DRAWINGS

For the purpose of illustrating the invention, there is shown in the drawings a form which is presently preferred, it being understood, however, that this invention is not limited to the precise arrangements and instrumentalities shown.

DETAILED DESCRIPTION OF THE PREFERRED EMBODIMENTS

Figure 1:
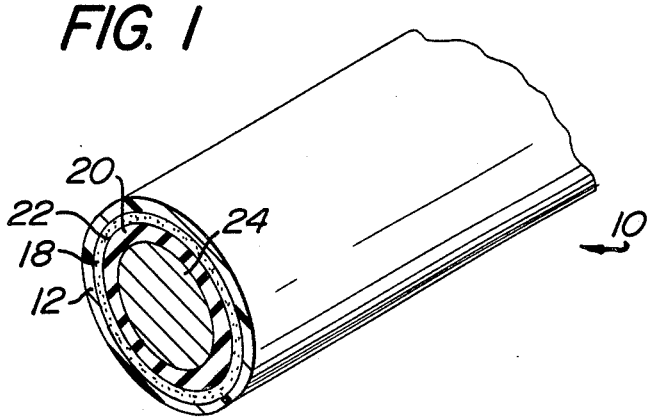
FIG. 1 is a perspective view, partially in cross section, showing a roller constructed in accordance with the present invention.

Referring to the drawings in detail, wherein like numerals indicate like elements throughout the several figures, there is shown a composite roller 10 constructed in accordance with the present invention.

Heat shrinkable tube 12 may be made from a neoprene or thermoplastic rubber, a polyolefin, urethane elastomer or fluorocarbon polymer, such as FEP or PTFE. Teflon FEP, manufactured by duPont Corporation, has been found to be particularly useful, although other materials from the broad classes just described may be used. Typically, the tube has been made heat shrinkable by expanding it under heat and then allowing it to cool at room temperature in the expanded state. On reapplication of heat, the tube "remembers" and attempts to shrink to its original size. Methods of manufacturing heat shrinkable tubing useful in the present invention are described, for example, in Eli, Jr. et al. U.S. Pat. No. Re. 27,028.

Tubing 12 is heat shrunk and bonded to a composite core of the roller by adhesive 18, which is applied to inner surface 14 of tubing 12. The composite core comprises a metal core 24 covered by rubber or other elastomeric material 20. However, the core of the roller need not be made from a rubber-metal composite and may be made of elastomer, metal, wood, glass, ceramic, plastic or a composite of these materials.

The rollers constructed according to the present invention find use wherever the special properties of the cover tubing are desired but for economical or mechanical reasons, the entire roller cannot be made of the covering substance.

Tubing 12 should have thickness of less than or equal to about 0.025 inch and preferably a thickness of 0.010-0.015 inch.

Figure 2:
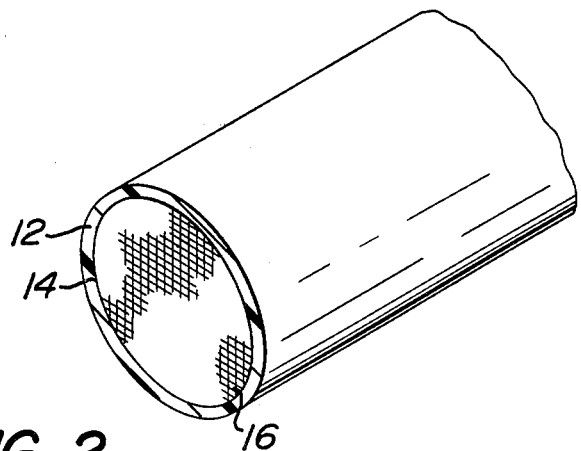
FIG. 2 is a partial perspective end view of the tubing depicting the pre-treatment of its inner surface.

Because Teflon, other fluorocarbon polymer materials, and some polyolefins are highly resistant to chemical attack, adhesive bonding, and have low coefficients of friction, adhesion will only result if inner surface 14 of tubing 12 is either mechanically abraded or chemically treated or both. This mechanical abrasion or chemical treatment is represented as 16 in FIG. 2.

Inner surface 14 of tube 12 can be mechanically abraded by such techniques as sandblasting or sanding. Sandblasting is accomplished by subjecting the interior surface of the tube to a high pressure stream of air and sand. This gouges out the surface of the film and creates tiny fractures which can serve as a footing for the adhesive. If sanding is used, a mandrel somewhat smaller than the inside diameter of the tube is covered with 80 grit sandpaper and rotated at 500 rpm. The tube is slipped over the rotating mandrel and held so that all parts of its inner surface eventually contact the sandpaper. The effect of this abrasion greatly increases the surface area of the tube's inner surface.

A typical chemical treatment would be to subject the inside surface 14 of tubing 12 to a chemical etch. The etching solution may be an activated form of sodium in an aromatic hydrocarbon solution such that when brought into contact with the preferred fluorocarbon polymer, the solution scavenges some of the F⁻ ions from the surface, exposing a carbonaceous surface that is more wettable and to which the adhesive is more bondable.

Figure 3:
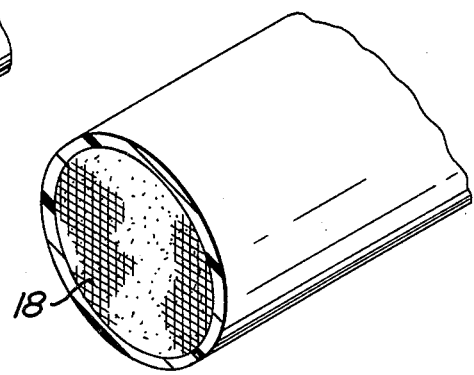
FIG. 3 is a view of the tubing similar to that of FIG. 2 showing the adhesive after it has been applied to the inner surface of the tube.

Next, as illustrated in FIG. 3, adhesive 18 is applied to the mechanically abraded or chemically treated inner surface 14 of tubing 12. By priming outer surface 22 of the composite roller core with an adhesive compatible to adhesive 18 applied to the inner surface of the tubing, a particularly strong bond results. Moreover, the adhesive applied to the outer surface 22 of the core may preferably contain a suitable cross-linking agent for the adhesives. The cross-linking agent may be present in only the adhesive applied to the core, if desired, since upon heating the cross-linking agent will migrate into the adhesive on the cover. Suitable cross-linking agents for given adhesives are known in the art.

The adhesive when applied may be tacky, but to enhance shipping, handling and constructing operations, solvents in the adhesive solution should be evaporated to provide a tack-free adhesive. This is true whether only inner surface 14 is covered with adhesive or whether both inner surface 14 and outer surface 22 are covered with adhesive.

The adhesive used to coat the inside of the heat shrinkable tube may be any of a number of low viscosity adhesive systems that can be applied from solution and will dry into a tack-free thermoplastic film. Adhesion is improved if the film is also thermosetting. Such systems can be based on vinyl, urethane, epoxy or nylon resins modified with an epoxy, melamine-formaldehyde, phenolformaldehyde thermoset resin, or with a phenolic, polyamide, or chlorinated rubber thermoplastic resin, or with a polyurethane, or butadiene-acrylonitrile elastomer. As used herein, the term "solution" will be understood to include emulsions, suspensions and slurries, as well as true solutions.

Various catalysts may be employed with all of the epoxy formulations to decrease cure temperature and accelerate cure time. These catalysts include hexamethylenetetramine, arsenic pentoxide, pentamethyldiethylenetriamine, diaminodiphenylsulfone, various anhydrides, substituted phthalocyanines and other suitable catalysts.

Plasticizers such as glycols, phenols or sulfonamides may be added to the formulation in order to vary the hardness of the adhesive bond. Their addition, however, may result in a decrease in strength of the adhesive bond.

Adhesive agents such as colophonium, phenol resins, conresin, coumarone-indene resin, resinester, hydrated and natural resins and resin derivatives may also be incorporated in this adhesive application to provide greater bond strength.

A serious problem in bonding heat shrinkable tubing to a core with an adhesive interface is the entrapment of lumps of adhesive and of bubbles of air and solvent. These problems can be minimized or eliminated completely by ensuring that the working environment is dust and dirt-free, filtering the adhesive prior to coating and ensuring that all solvents have evaporated prior to heating the tube.

It is desirable to create an even, bubble-free, permanent adhesive bond between the heat shrinkable tube and the core to which it is bonded. Heat should be applied to the shrinkable tube in a way that eliminates entrapped air bubbles or solvent between the tube and the core. It is most important that the tube be shrunk tightly and evenly on the core. Any unevenness or incomplete or partial shrinking of the tube may result in air pockets, or pockets of loosely bonded adhesive where delamination could occur under conditions of severe stress.

Figure 4:
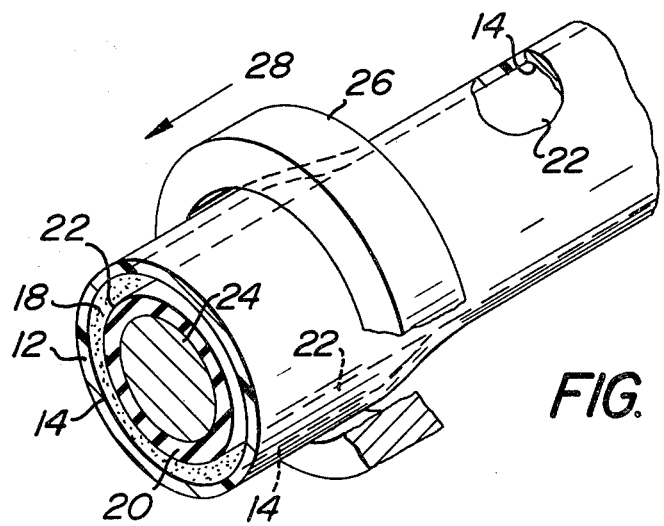
FIG. 4 is a partial perspective end view, partly in cross section, depicting the manner in which the tube is heat shrunk around the core.

The heat serves the dual purpose of shrinking the tubing and melting the adhesive on the inner surface of the tube. As the tube shrinks, the inside surface is bonded to the core by the adhesive. FIG. 4 shows heating means 26 traveling in the direction of arrow 28. To the left of heating means 26, as shown in the drawing, inner surface 14 of tubing 12 is separated from outer surface 22 of rubber covering 20. To the right of heating means 26, inner wall 14 is substantially adjacent to outer wall 22. It is not necessary that the heating means travel in a horizontal direction, as shown, but may travel in a vertical or any other direction so long as it travels in a way to eliminate entrapped air bubbles or solvent from between the tube and the core. Any method of heating which employs a torus of heat which can travel along the face length of the roller will be considered useful in the present invention.

One method is the use of torus or a pipe or tubing in the shape of a helix having a perforated inside diameter which expels ignited liquid petroleum gas or natural gas used to shrink the tubing. This torus may also be electrically heated.

Once the tubing has been heat shrunk around the core, the adhesive should be cured at high temperature. One method of accomplishing this, which is particularly useful in curing adhesive applied to shrinkable tubing over a metal core, is to maintain and elevate the temperature of the metal core after the tubing has been shrunk onto it. This may be achieved by induction heating. The metal core with its heat shrunk thermoplastic cover is suspended in the center of a single layer copper tubing spiral coil in which an alternating current of 400–1000 hertz is induced in the metal core.

Another method of achieving an extended high temperature cure of adhesive applied to shrinkable tubing is by dielectric heating. Using this method, a rubber covered metal core with tubing already shrunk onto it is suspended in a metal cylinder and an alternating current having a frequency of from 2–40 megahertz is applied to the cylinder and metal core which act as electrodes. Heat is generated in the sleeve and the adhesive which together act as dielectric materials. The dielectric properties of these materials determine what potential must be maintained between the two electrodes in order to achieve the desired cure temperature. Values between 2000 and 6000 volts per inch of separation between the electrodes are practicable, the highest voltage applied being limited by the spark-over value and corona discharge. Various fillers may be added to the adhesive to alter its dielectric properties.

To ensure a bubble-free, smooth surface to surface bond, the dielectric and induction heat cure methods may be modified by providing that the metal cylinder or induction coil surrounding the sleeve-core assembly has an effective face length of about 3 inches and that the metal cylinder or coil be allowed to travel the length of the sleeve-core assembly so that the sleeve is gradually shrunk and bonded to the core, a small section of its face length at a time.

The novel method of constructing the improved composite rollers of the present invention will now be described in further detail with reference to the following specific, non-limiting examples. All parts and percentages are by weight, unless otherwise indicated.

EXAMPLE 1

The inner surface of a heat shrinkable polyolefin tube is mechanically abraded to increase its surface area and then coated with a B-stage epoxy resin, such as Dexter Hysol's EA9414. This one component system contains both resin and curing agent and must be reduced in viscosity by the addition of a solvent such as methylethylketone or acetone to the resin. The resin is then applied to the inner surface of the tube and allowed to dry. The tube is then slipped over the metal core and heat is applied to the tube, causing it to shrink onto the core. The heat serves the dual purpose of shrinking the tubing and melting the adhesive on its inner surface. As the tube shrinks, the inside surface is bonded to the core by the adhesive.

EXAMPLE 2

The inner surface of a heat shrinkable fluorocarbon plastic tube is first etched with a solution of sodium in napthalene/tetrahydrofuran and then coated with an epoxy which is allowed to dry before the tube is shrunk onto a metal core. The epoxy adhesive formulation used is composed of 100 parts of a diglycidyl ether of bisphenol A, 28.5 parts of 4,4' methylene-dianiline, 60 parts of powdered aluminum and 10 parts of colloidal silica. These ingredients are prepared as a hot melt and then ground to a fine powder of 60 mesh or less. Enough methyl ethyl ketone is then added to make a slurry having a viscosity of less than 1000 centipoise. A one component hot melt adhesive may be prepared by incorporating dicyandiamide as the curing agent. In the case of all solid materials to be dispersed in liquid form, the solids may be in the form of powders having a particle size of less than 10 microns. After the adhesive has dried on the tube, the tube is slipped over and shrunk onto a rubber covered metal core. It is then placed in an oven for six hours at 280° F. to complete the cure of the adhesive system.

EXAMPLE 3

The inner surface of a heat shrinkable FEP plastic tube is first mechanically abraded and then etched with the chemical etch solution used in Example 2. The inner surface is then coated with a phenolic modified epoxy consisting of 100 parts of a diglycidyl ether of bisphenyl A (M.W. 1000), 50 parts phenolic resin and 150 parts powdered aluminum cured with 9 parts dicyandiamide and stabilized with 1.5 parts copper 8-quinolinolate. This formulation is available from Shell Chemical Company as Epon 422-J.

After the adhesive has dried on the inner surface of the tube, the tube is slipped over a rubber-metal composite core and heat shrunk around it. It is then placed in an oven for 6 hours at 280° F. to complete the cure of the adhesive system.

EXAMPLE 4

The bondable inner surface of a heat shrinkable vinyl tube is coated with a nylon modified epoxy or phenolic resin such as Elvamide 8061, 8063 or 8064 modified with Epon 828. The Elvamide nylon resins have amino and carboxyl groups as well as amide hydrogens along the polyamide chains which crosslink epoxy thermoset resins during the cure cycle, producing a tough, flexible adhesive bond between a heat shrinkable tube and a roller core.

Elvamide 8061 should first be dissolved in a lower aliphatic alcohol mixed with chlorinated hydrocarbon. A 10% solids solution of 8061 resin is typically prepared by dissolving 10 parts of the resin in 90 parts of a 70/30 methanol/trichloroethylene solution with constant stirring under reflux at 140° F. for about 3 hours. To 750 parts of this solution is added with rapids stirring 75 parts by weight of Epon 828. 7.5 parts of a latent curing agent such as dicyandiamide may be added with continued stirring under reflux. The mixture should then be brought to room temperature, sealed and kept cool. The formulation started here will contain, without fillers, 19% solids, and will have a viscosity of less than 1000 centipoise, making it an ideal adhesive for heat bonding shrinkable tubing to roller cores.

After the adhesive has dried on the tube, the tube is slipped over and shrunk onto a rubber covered metal core. The core may be primed with the same adhesive solution as used on the sleeve except that 7.5 parts of triethylenetetramine should be substituted for dicyandiamide. It is then placed in an oven for 6 hours at 280° F. to complete the cure of the adhesive system.

The specific examples related above should not be deemed to preclude other equivalent methods. For example, a three component system comprising a two component urethane and a catalyst may be applied to the inner surface of a plastic heat shrinkable tube. The same system could be applied to the core with a cross linking agent being added just prior to applying the system to the core. The solvent is then driven off to get a tack-free adhesive. By having adhesive on both the inner surface of the tubing and the outer surface of the core, an enhanced adhesive bond results.

The present invention may be embodied in other specific forms without departing from the spirit or essential attributes thereof and, accordingly, reference should be made to the appended claims, rather than to the foregoing specification as indicating the scope of the invention.

We claim:

1. A method for bonding a thin tube of heat shrinkable material to a core comprising the steps of:
   (a) coating said tube on its inner surface with a first thermoplastic adhesive which does not contain a curing agent in a solvent solution which renders said first adhesive tacky;
   (b) evaporating said solvent from said first adhesive solution to produce a tack-free adhesive, capable of being stored for several months without substantial loss of adhesive qualities;
   (c) coating said core with a second adhesive containing a curing agent in an effective amount to cure both adhesives in a cross-linking chemical reaction;
   (d) placing said tube having its inner surface coated with said tack-free adhesive over said core; and
   (e) heat shrinking said tube onto said core at a temperature sufficient to melt said adhesives to form an adhesive system whereby said curing agent migrates into said first adhesive and cures both adhesives in a cross-linking chemical reaction to bond said tube to said core.

2. A method according to claim 1 wherein said heat shrinkable material is selected from the group consisting of vinyl, fluorocarbon and polyolefin polymers.

3. A method according to claim 2 wherein said tube comprises FEP and has a thickness of not greater than about 0.025 inch.

4. A method according to claim 2 comprising a preliminary step of mechanically abrading said inner surface of said tube to increase its surface area to enhance said adhesive bond between said core and said tube.

5. A method according to claim 4 comprising a step between said mechanical abrading step and said coating step of chemically treating said inner surface of said tube to improve wettability of said inner surface by said first adhesive.

6. A method according to claim 1 wherein said first adhesive is applied from a solvent solution having a viscosity of less than approximately 1000 centipoise, such that a dry, tack-free film remains evenly coated on said inner surface of said tube when said solvent evaporates.

7. A method according to claim 1 wherein said core comprises a metal shaft having an elastomeric material coated thereon.

8. A method according to claim 1 wherein said first adhesive is selected from the group consisting of B-stage epoxy, polyamide modified epoxy and urethane resin systems.

9. A method according to claim 1 wherein said adhesives are cured by dielectric heating after said tube is bonded to said core.

10. A roller comprising a thin tube of fluorocarbon polymer bonded to a core by a method comprising the steps of:
   (a) coating said tube on its inner surface with a first thermoplastic adhesive which does not contain a curing agent in a solvent solution which renders said first adhesive tacky;
   (b) evaporating said solvent from said first adhesive solution to produce a tack-free adhesive capable of being stored for several months without substantial loss of adhesive qualities;
   (c) coating said core with a second adhesive containing a curing agent in an effective amount to cure both adhesives in a cross-linking chemical reaction;
   (d) placing said tube having its inner surface coated with said tack-free adhesive over said core; and
   (e) heat shrinking said tube onto said core at a temperature sufficient to melt said adhesives to form an adhesive system whereby said curing agent migrates into said first adhesive and cures both adhesives in a cross-linking chemical reaction to bond said tube to said core.

11. A roller according to claim 10, said tube having a thickness not greater than about 0.025 inch, said heat shrinkable material being selected from the group consisting of vinyl, fluorocarbon and polyolefin polymers, and said method comprising a preliminary step of mechanically abrading said inner surface of said tube to increase its surface area to enhance said adhesive bond between said core and said tube.

12. A roller according to claim 10, said heat shrinkable material being selected from the group consisting of vinyl, fluorocarbon and polyolefin polymers, and said method further comprising the preliminary steps of mechanically abrading said inner surface of said tube to increase its surface area to enhance said adhesive bond between said core and said tube and chemically treating said inner surface of said tube to improve wettability of said inner surface by said first adhesive.

13. A roller according to claim 10 wherein said roller is a printing press roller.

14. A printing press roller according to claim 13 wherein said fluorocarbon polymer tube comprises FEP having a thickness of about 0.010–0.015 inch.

* * * * *